United States Patent
Huang et al.

(10) Patent No.: US 12,227,109 B2
(45) Date of Patent: Feb. 18, 2025

(54) POWER BATTERY HEATING SYSTEM AND CONTROL METHOD AND CONTROL CIRCUIT THEREOF

(71) Applicant: CONTEMPORARY AMPEREX TECHNOLOGY (HONG KONG) LIMITED, Hong Kong (CN)

(72) Inventors: Xiaojian Huang, Ningde (CN); Zhimin Dan, Ningde (CN); Xianxi Pan, Ningde (CN); Jinfeng Gao, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 723 days.

(21) Appl. No.: 17/562,562

(22) Filed: Dec. 27, 2021

(65) Prior Publication Data
US 2023/0037865 A1    Feb. 9, 2023

Related U.S. Application Data

(63) Continuation of application No. PCT/CN2021/110706, filed on Aug. 5, 2021.

(51) Int. Cl.
*B60L 58/27*    (2019.01)
*H01M 10/42*    (2006.01)
(Continued)

(52) U.S. Cl.
CPC ........... *B60L 58/27* (2019.02); *H01M 10/425* (2013.01); *H01M 10/441* (2013.01);
(Continued)

(58) Field of Classification Search
CPC ...... B60L 58/27; B60L 50/60; B60L 2240/42; B60L 2240/545; B60L 58/19;
(Continued)

(56) References Cited

U.S. PATENT DOCUMENTS

| 7,990,098 B2 * | 8/2011 | Perisic .................... B60L 50/61 363/55 |
| 8,452,490 B2 | 5/2013 | Lakirovich et al. |

(Continued)

FOREIGN PATENT DOCUMENTS

| CN | 104118331 A | 10/2014 |
| CN | 106025443 A | 10/2016 |

(Continued)

OTHER PUBLICATIONS

Notice of Reasons for Refusal dated Oct. 10, 2023 received in Japanese Patent Application No. JP 2021-574847.
(Continued)

*Primary Examiner* — Giovanni Astacio-Oquendo
*Assistant Examiner* — Haidong Zhang
(74) *Attorney, Agent, or Firm* — Scully, Scott, Murphy & Presser, P.C.

(57) ABSTRACT

The present application provide a control method of a power battery heating system. The method includes: controlling all upper bridge arms of a first bridge arm group and all lower bridge arms of a second bridge arm group to be turned on, and all lower bridge arms of the first bridge arm group and all upper bridge arms of the second bridge arm group to be turned off, so as to form a first loop; controlling all the lower bridge arms of the first bridge arm group and all the upper bridge arms of the second bridge arm group to be turned on, and all the upper bridge arms of the first bridge arm group and all the lower bridge arms of the second bridge arm group to be turned off, so as to form a second loop. The method is used to heat the power battery.

17 Claims, 8 Drawing Sheets

(51) Int. Cl.
  *H01M 10/44* (2006.01)
  *H01M 10/615* (2014.01)
  *H01M 10/625* (2014.01)
  *H02J 7/00* (2006.01)
  *H02P 27/06* (2006.01)
  *B60L 50/60* (2019.01)

(52) U.S. Cl.
  CPC ....... *H01M 10/443* (2013.01); *H01M 10/615* (2015.04); *H01M 10/625* (2015.04); *H02J 7/007192* (2020.01); *H02P 27/06* (2013.01); *B60L 50/60* (2019.02); *B60L 2240/42* (2013.01); *B60L 2240/545* (2013.01); *H01M 2010/4271* (2013.01); *H01M 2220/20* (2013.01); *H02J 2207/20* (2020.01)

(58) Field of Classification Search
  CPC .......... B60L 2270/145; B60L 58/12; H01M 10/425; H01M 10/441; H01M 10/443; H01M 10/615; H01M 10/625; H01M 2010/4271; H01M 2220/20; H01M 10/44; H01M 10/48; H01M 10/63; H02J 7/007192; H02J 2207/20; H02J 7/00; H02J 7/007194; H02P 27/06; Y02E 60/10; Y02T 10/70; Y02T 10/7072; Y02T 10/72; B60Y 2200/91
  See application file for complete search history.

(56) References Cited

U.S. PATENT DOCUMENTS

| | | | |
|---|---|---|---|
| 9,975,447 B2 | 5/2018 | Tokushige et al. | |
| 2002/0024221 A1* | 2/2002 | Grewe | B60W 10/06 290/40 C |
| 2011/0144861 A1 | 6/2011 | Lakirovich et al. | |
| 2012/0176082 A1 | 7/2012 | Lee et al. | |
| 2016/0318418 A1 | 11/2016 | Tokushige et al. | |
| 2019/0305393 A1 | 10/2019 | Oguma | |
| 2020/0207237 A1* | 7/2020 | Zuo | H01M 10/6571 |
| 2021/0061128 A1 | 3/2021 | Lee et al. | |
| 2021/0354592 A1 | 11/2021 | Zuo et al. | |

FOREIGN PATENT DOCUMENTS

| | | | |
|---|---|---|---|
| CN | 107039708 A | 8/2017 | |
| CN | 109823234 A | 5/2019 | |
| CN | 109962660 A | 7/2019 | |
| CN | 110015202 A | 7/2019 | |
| CN | 110116653 A | 8/2019 | |
| CN | 110789400 A | 2/2020 | |
| CN | 110962692 A | 4/2020 | |
| CN | 111347900 A | 6/2020 | |
| CN | 111347924 A | 6/2020 | |
| CN | 111347937 A | 6/2020 | |
| CN | 111355430 A | 6/2020 | |
| CN | 111391717 A | 7/2020 | |
| CN | 111391718 A | 7/2020 | |
| CN | 111660875 A | 9/2020 | |
| CN | 212587580 U | 2/2021 | |
| CN | 112550079 A | 3/2021 | |
| CN | 112810467 A | 5/2021 | |
| CN | 112821842 A | 5/2021 | |
| CN | 112977171 A | 6/2021 | |
| CN | 113071346 A | 7/2021 | |
| CN | 113119802 A | 7/2021 | |
| CN | 213734669 U | 7/2021 | |
| CN | 113506934 A | 10/2021 | |
| DE | 102013226372 A1 | 6/2015 | |
| JP | 2004112903 A | 4/2004 | |
| JP | 2004336844 A | 11/2004 | |
| JP | 2011188600 A | 9/2011 | |
| JP | 2013187919 A | 9/2013 | |
| JP | 2014226000 A | 12/2014 | |
| JP | 2016170000 A | 9/2016 | |
| JP | 2020110042 A | 7/2020 | |
| JP | 2021002513 A | 1/2021 | |
| JP | 2021012853 A | 2/2021 | |
| JP | 2021013226 A | 2/2021 | |
| WO | 2018030143 A1 | 2/2018 | |
| WO | 2019244680 A1 | 12/2019 | |
| WO | 2020125770 A1 | 6/2020 | |
| WO | 2020125771 A1 | 6/2020 | |
| WO | 2020259071 A1 | 12/2020 | |
| WO | 2021019608 A1 | 2/2021 | |
| WO | 2021106195 A1 | 6/2021 | |
| WO | 2021135888 A1 | 7/2021 | |

OTHER PUBLICATIONS

Notification of Registration and Grant of Patent for Invention dated Oct. 16, 2023 received in Chinese Patent Application No. CN 202180048180.9.
Notification of Registration and Grant of Patent for Invention dated Oct. 23, 2023 received in Chinese Patent Application No. CN 202280004716.1.
Notification of Registration and Grant of Patent for Invention dated Nov. 9, 2023 received in Chinese Patent Application No. CN 202280004725.0.
Notice of Reasons for Refusal dated May 13, 2024 received in Japanese Patent Application No. 2023-535941.
Notice of Reasons for Refusal dated Jun. 24, 2024 received in Japanese Patent Application No. 2023-537696.
Notice of Reasons for Refusal dated Apr. 22, 2024 received in Japanese Patent Application No. JP 2023-524100.
Notice of Reasons for Refusal dated Feb. 13, 2024 received in Japanese Patent Application No. JP 2021-574847.
International Search Report and Written Opinion dated Jun. 28, 2022 received in International Application No. PCT/CN2022/088187.
International Search Report and Written Opinion dated Apr. 1, 2022 received in International Application No. PCT/CN2021/116735.
International Search Report and Written Opinion dated May 18, 2022 received in International Application No. PCT/CN2021/116736.
International Search Report and Written Opinion dated Jul. 1, 2022 received in International Application No. PCT/CN2022/088567.
International Search Report and Written Opinion dated Aug. 3, 2022 received in International Application No. PCT/CN2021/132202.
Extended European search report dated Aug. 12, 2024 received in European Patent Application No. 21964480.4.
Extended European search report dated Oct. 23, 2024 received in European Patent Application No. 22851620.9.

* cited by examiner

700 — S710: sending a first heating signal to a switch module, where the first heating signal is configured to control all upper bridge arms of a first bridge arm group to be turned on, all lower bridge arms of the first bridge arm group to be turned off, all lower bridge arms of a second bridge arm group to be turned on, and all upper bridge arms of the second bridge arm group to be turned off, so as to form a first loop between all the upper bridge arms of the first bridge arm group, all the windings of a first motor, at least one inductor, all the lower bridge arms of the second bridge arm group, and a power supply module S720: sending a second heating signal to the switch module, where the second heating signal is configured to control all the lower bridge arms of the first bridge arm group to be turned on, all the upper bridge arms of the first bridge arm group to be turned off, all the upper bridge arms of the second bridge arm group to be turned on, and all the lower bridge arms of the second bridge arm group to be turned off, so as to form a second loop between all the lower bridge arms of the first bridge arm group, all the windings of the first motor, at least one inductor, all the upper bridge arms of the second bridge arm group, and the power supply module; wherein the first loop and the second loop are configured to generate heat in a power battery by a current to heat the power battery, and currents flowing through all the windings of the first motor have the same magnitude and phase

Fig. 7

POWER BATTERY HEATING SYSTEM AND CONTROL METHOD AND CONTROL CIRCUIT THEREOF

CROSS-REFERENCE TO RELATED APPLICATIONS

This application is a continuation of International Application No. PCT/CN2021/110706, filed on Aug. 5, 2021, the disclosure of which is hereby incorporated by reference in its entirety.

TECHNICAL FIELD

The present application relates to the field of battery technology, in particular to a power battery heating system and a control method and a control circuit thereof.

BACKGROUND

Traction batteries are widely used in new energy vehicles, consumer electronics, energy storage systems and other fields due to advantages of high energy density, recyclable charging, safety and environmental protection.

However, the use of traction batteries in low-temperature environment will be subject to certain restrictions. Specifically, the discharge capacity of the power battery in low-temperature environment will be severely degraded, and the battery cannot be charged in low-temperature environment. Therefore, in order to use the power battery normally, it is necessary to heat the power battery in a low-temperature environment.

The traditional power battery heating technology may lead to the problem of excessive vibration noise of a motor in the process of heating the power battery by a motor loop.

SUMMARY

The embodiment of the present application provides a power battery heating system and a control method and control circuit thereof, which may effectively suppress vibration noise of a motor when a battery is heated through a loop of the motor.

In a first aspect, a control method of a power battery heating system is provided. The power battery heating system includes a first motor, at least one inductor, a switch module and a power supply module. where the switch module includes a first bridge arm group and a second bridge arm group, each bridge arm of the first bridge arm group and the second bridge arm group includes an upper bridge arm and a lower bridge arm, connection points of the upper bridge arm and the lower bridge arm of each bridge arm of the first bridge arm group are connected to all the windings of the first motor in a one-to-one correspondence, connection points of the upper bridge arm and the lower bridge arm of each bridge arm of the second bridge arm group are connected to the at least one inductor in a one-to-one correspondence, and the first bridge arm group and the second bridge arm group are both connected in parallel to the power supply module. The control method includes: sending a first heating signal to the switch module, where the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, all the windings of the first motor, the at least one inductor, all the lower bridge arms of the second bridge arm group and the power supply module; and sending a second heating signal to the switch module, where the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, all the windings of the first motor, the at least one inductor, all the upper bridge arms of the second bridge arm group and the power supply module; where the first loop and the second loop are configured to generate heat in a power battery by a current to heat the power battery, and currents flowing through all the windings of the first motor have the same magnitude and phase.

By controlling currents flowing through all the windings of the first motor to have the magnitude and phase, vibration noise of the motor may be effectively suppressed when a loop of the first motor is used to heat the power battery. In addition, the power battery heating system provided by the present application will not cause the motor to run, which can solve the heating problem of a rotor in the motor, thereby prolonging the self-heating service time of the battery.

In one possible implementation, the first motor is a three-phase motor.

In one possible implementation, the at least one inductor is an external inductor connected to a neutral point of the first motor.

In one possible implementation, the at least one inductor is at least one winding of a second motor.

In one possible implementation, the power battery heating system further includes the second motor, and the at least one inductor is connected to all the windings of the second motor, currents flowing through all the windings of the second motor have the same magnitude and phase.

In one possible implementation, the second motor is a three-phase motor.

In one possible implementation, the sending a first heating signal and a second heating signal to the switch module includes: sending the first heating signal and the second heating signal to the switch module alternately at a preset frequency.

In one possible implementation, the power supply module is the power battery, the sending the first heating signal and the second heating signal to the switch module includes: determining a state of charge (SOC) of the power battery; and sending the first heating signal and the second heating signal to the switch module under the condition that the SOC is greater than a first threshold.

When the SOC of the power battery is greater than the first threshold, that is, the power of the power battery is sufficient, the first heating signal and the second heating signal are alternately sent to the switch module to form alternating current with different current directions, and the alternating current is used to generate heat by internal resistance of the power battery, thereby heating the power battery and improving the heating efficiency.

In a possible implementation, the sending a first heating signal and a second heating signal to the switch module includes: receiving, by a motor controller, a control signal sent by a vehicle control unit, the control signal being configured to indicate to heat the power battery; and sending, by the motor controller, the first heating signal and the second heating signal to the switch module according to the control signal.

In a possible implementation, the control method further includes: sending a heating stop signal to the switch module when a temperature of the power battery reaches a preset temperature and/or a temperature rise of the power battery is abnormal, the heating stop signal being configured to indicate to stop heating the power battery.

In a possible implementation, the control module is specifically configured to: acquire a working state of the first motor; and send the first heating signal and the second heating signal to the switch module when the first motor is in a non-working state.

By judging the working state of the motor, it is prevented that the power battery is heated when the motor is in a driving state, which may affect the performance of a power device such as a vehicle.

In a possible implementation, the control module is further configured to: receive a heating request sent by a battery management system (BMS), the heating request being configured to indicate that the power battery meets a heating condition.

By receiving the heating request sent by the BMS, the control module can heat the power battery timely to avoid affecting the use of power devices such as vehicles.

In a second aspect, provided is a power battery heating system. The power battery heating system includes a first motor, at least one inductor, a switch module and a power supply module. where the switch module includes a first bridge arm group and a second bridge arm group, each bridge arm of the first bridge arm group and the second bridge arm group includes an upper bridge arm and a lower bridge arm, connection points of the upper bridge arm and the lower bridge arm of each bridge arm of the first bridge arm group are connected to all the windings of the first motor in a one-to-one correspondence, connection points of the upper bridge arm and the lower bridge arm of each bridge arm of the second bridge arm group are connected to the at least one inductor in a one-to-one correspondence, and the first bridge arm group and the second bridge arm group are both connected in parallel to the power supply module. The control module is configured to: send a first heating signal to the switch module, where the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, all the windings of the first motor, the at least one inductor, all the lower bridge arms of the second bridge arm group and the power supply module; and send a second heating signal to the switch module, where the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, all the windings of the first motor, the at least one inductor, all the upper bridge arms of the second bridge arm group and the power supply module; where the first loop and the second loop are configured to generate heat in a power battery by a current to heat the power battery, and currents flowing through all the windings of the first motor have the same magnitude and phase.

In one possible implementation, the first motor is a three-phase motor.

In one possible implementation, the at least one inductor is an external inductor connected to a neutral point of the first motor.

In one possible implementation, the at least one inductor is at least one winding of a second motor.

In one possible implementation, the power battery heating system further includes the second motor, and the at least one inductor is connected to all the windings of the second motor, currents flowing through all the windings of the second motor having the same magnitude and phase.

In one possible implementation, the second motor is a three-phase motor.

In a third aspect, a control circuit of a power battery heating system is provided. The control circuit includes a processor configured to execute the control method as in the first aspect and any possible implementation thereof.

In a fourth aspect, a power device is provided. The power device includes a power battery and the power battery heating system in the second aspect.

BRIEF DESCRIPTION OF THE DRAWINGS

To describe the technical solutions in the embodiment of the present application more clearly, the following briefly describes the accompanying drawings required in the embodiments of the present application. Apparently, the accompanying drawings in the following descriptions show merely some embodiments of the present application, and those of ordinary skill in the art may still derive other accompanying drawings from these accompanying drawings without making inventive efforts.

FIG. 7 is a schematic frame diagram of a control method of a power battery heating system provided in the embodiment of the present application;

DESCRIPTION OF EMBODIMENTS

Figure 1:
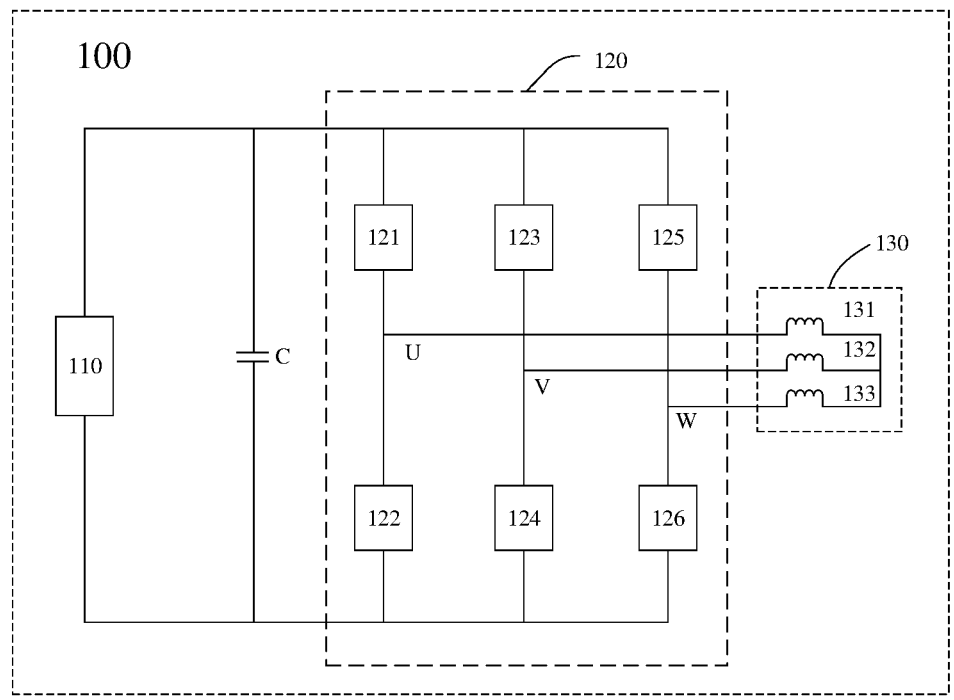
FIG. 1 is a circuit diagram of a traditional power battery heating system.

Implementations of the present application will be further described in detail with reference to the drawings and embodiments. The following detailed description of the embodiments and the drawings are intended to illustrate the principle of the present application, but are not intended to limit the scope of the present application, that is, the present application is not limited to the described embodiments.

In the description of the present application, it should be noted that, unless otherwise specified, "plurality" means two or more than two; the terms "upper", "lower", "left", "right", "inner", "outer" and the like indicate the orientation or positional relationship only for the convenience of describing the present application and simplifying the description, but do not indicate or imply that the referred device or element must have a specific orientation, be constructed and operated in a specific orientation, and therefore cannot be understood as limiting the present application. In addition, the terms "first", "second", "third" and the like are only used for descriptive purposes and cannot be understood as indicating or implying relative importance. "Vertical" does not "strictly vertical", but means that it is within an allowable range of error. "Parallel" does not mean "strictly parallel", but means that it is within an allowable range of error.

Orientation words used in the following description are all for directions shown in the drawings, and do not limit the specific structure of the present application. In the description of the present application, it should be noted that unless otherwise specified and limited, the terms "installed", "connected", and "attached" should be understood in a broad sense, for example, they may mean a fixed connection, a detachable connection or an integrated connection; they may mean a direct connection, or an indirect connection through an intermediate medium. For those of ordinary skill in the art, the specific meanings of the above terms in the present application may be understood according to specific conditions.

With the development of the times, new energy vehicles have great market prospects and can effectively promote energy conservation and emission reduction due to their environmental protection property, low voice and low use cost, and are conducive to the development and progress of society.

Due to the electrochemical characteristics of the power battery, the charging and discharging capability of the power battery is greatly limited in a low-temperature environment, which seriously affects the customer's experience of using the vehicle in winter. Therefore, in order to use the power battery normally, it is necessary to heat the power battery in the low-temperature environment.

The power battery in the embodiments of the present application may be a lithium ion battery, a lithium metal battery, a lead-acid battery, a nickel barrier battery, a nickel hydrogen battery, a lithium sulfur battery, a lithium air battery, or a sodium ion battery and the like, which are not limited here. In terms of scale, the battery in the embodiments of the present application may be a battery cell, a battery module or a battery pack, which is not limited here. In terms of application scenarios, the battery may be used in a power device such as a vehicle or a ship. For example, it may be used in an electric vehicle to supply power to the motor of the electric vehicle as the power source of the electric vehicle. The battery may also supply power to other electrical devices in the electric vehicle, such as an air conditioner and a player in the vehicle.

For convenience of description, the present application of the power battery to a new energy vehicle (electric vehicle) will be described as an example.

The driving motor and its control system are one of the core components of a new energy vehicle, and its driving characteristics determine the main performance indicators of the vehicle driving. The motor drive system of a new energy vehicle is mainly composed of an electromotor (motor), a power converter, a motor controller (for example, an inverter), various detection sensors, and a power source. The motor is a rotating electromagnetic machinery operating on the principle of electromagnetic induction, and is used to convert electrical energy to mechanical energy. During operation, it absorbs electric power from the electrical system and outputs mechanical power to the mechanical system.

In order to avoid unnecessary cost when heating the power battery, a motor loop may be used to heat the power battery.

FIG. 1 shows a circuit diagram of a conventional power battery heating system. As shown in FIG. 1, the power battery heating system 100 may include a power supply module 110, a switch module 120 connected to the power supply module 110, and a motor winding 130 connected to the switch module 120.

The power supply module 110 may be implemented not only by the power battery itself, but also by an external power supply module such as a charging pile. The heating energy provided by the external power supply module may be output by an external DC charger, or output by an external AC charger after rectification, which is not specifically limited here.

The switch module 120 may be implemented by various types of switches. For example, the switch module 120 may be implemented by an inverter in a motor driver system, where the inverter may be implemented by a bridge arm switch of an insulated gate bipolar transistor (IGBT). Specifically, the number of bridge arms of the inverter is the same as the number of windings in the motor winding 130. For example, if the motor winding 130 includes three phases of windings, the inverter includes three phases of bridge arms, that is, a U-phase bridge arm, a V-phase bridge arm, and a W-phase bridge arm. Each of the three phases of bridge arms has an upper bridge arm and a lower bridge arm, and the upper bridge arm and the lower bridge arm are each provided with a switch unit, that is, the switch module 120 respectively includes an upper bridge arm switch 121 and a lower bridge arm switch 122 in the U-phase bridge arm, an upper bridge arm switch 123 and a lower bridge arm switch 124 in the V-phase bridge arm, and an upper bridge arm switch 125 and a lower bridge arm switch 126 in the W-phase bridge arm.

The motor winding 130 may specifically include a winding 131 connected to the U-phase bridge arm, a winding 132 connected to the V-phase bridge arm, and a winding 133 connected to the W-phase bridge arm. One end of the winding 131 is connected to a connection point of the upper bridge arm and the lower bridge arm in the U-phase bridge arm, one end of the winding 132 is connected to a connection point of the upper bridge arm and the lower bridge arm in the V-phase bridge arm, and one end of the winding 133 is connected to a connection point of the upper bridge arm and the lower bridge arm in the W-phase bridge arm. The other end of the winding 131, the other end of the winding 132, and the other end of the winding 133 are connected together.

It should be noted that the motor winding 130 is not limited to a three-phase motor, but may also be a six-phase motor, and correspondingly, the switch module 120 may include six phases of bridge arms.

In some embodiments, the current may be modulated by controlling a switch in the switch module 120 to be turned on and off periodically. For example, the current may be modulated by controlling a target upper bridge arm switch and a target lower bridge arm switch in the inverter to be turned on and off periodically. In an example, if the target upper bridge arm switch is the upper bridge arm switch 121, the target lower bridge arm switch is the lower bridge arm switch 124 and/or the lower bridge arm switch 126. In another example, if the target upper bridge arm switch is the upper bridge arm switch 123, the target lower bridge arm switch is the lower bridge arm switch 122 and/or the lower bridge arm switch 126. In another example, if the target upper bridge arm switch is the upper bridge arm switch 125, the target lower bridge arm switch is 122 and/or the lower bridge arm switch 124.

It should be noted that the target upper bridge arm switch and the target lower bridge arm switch periodically turned on and off in each cycle may be the same or different, which is not limited here. For example, the upper bridge arm switch 121 and the lower bridge arm switch 124 are controlled to be turned on and off in each cycle. For another example, in a first cycle, the upper bridge arm switch 121 and the lower bridge arm switch 124 are controlled to be turned on and off; in a second cycle, the upper bridge arm switch 123 and the lower bridge arm switch 122 are controlled to be turned on and off; in a third cycle, the upper bridge arm switch 121, the lower bridge arm switch 124 and the lower bridge arm switch 126 are controlled to be turned on and off, that is, the controlled target upper bridge arm switch and the controlled target lower bridge arm switch may be different in different cycles.

By controlling the target upper bridge arm switch and the target lower bridge arm switch to be turned on and off periodically, the current directions in different loops formed between the power supply module, the target upper bridge arm switch, the target lower bridge arm switch and the motor winding are different, thus generating alternating current, that is, the power supply module alternately performs charging and discharging.

The target conduction switch includes at least one upper bridge arm switch and at least one lower bridge arm switch. The at least one upper bridge arm switch and the at least one lower bridge arm switch are located on different bridge arms.

With the power battery heating system shown in FIG. 1, due to asymmetry of three phases of currents flowing through the motor winding and the high frequency of the currents, there is a problem of excessive vibration noise of a motor in the process of heating the power battery by a motor loop.

The embodiments of the present application provide a control method of a power battery heating system. By controlling the switch module, a loop is formed between the power supply module, the switch module, the motor windings and the at least one inductor independent of the motor windings, and by controlling currents flowing into the motor windings to have same magnitude and phase, thereby effectively reducing the problem of excessive vibration noise of a motor in the process of heating the power battery by a motor loop.

Figure 2:
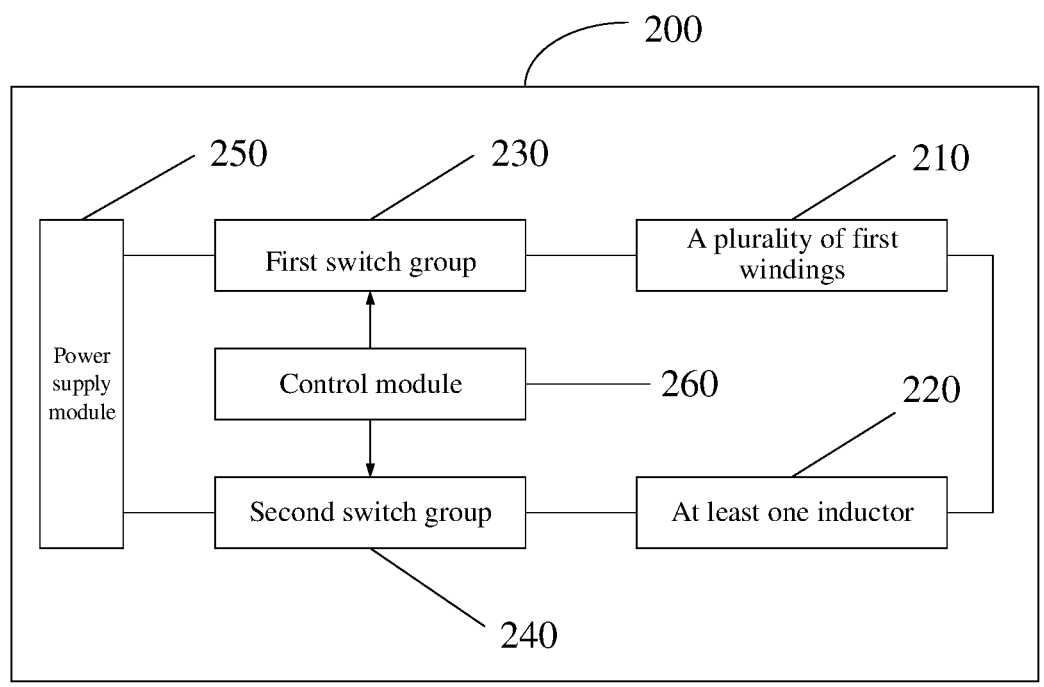
FIG. 2 is a schematic block diagram of a power battery heating system provided in an embodiment of the present application.

FIG. 2 shows a schematic block diagram of a power battery heating system 200 provided by the embodiments of the present application. As shown in FIG. 2, the power battery heating system 200 includes: a plurality of first windings 210, at least one inductor 220, a first switch group 230, a second switch group 240, a power supply module 250, and a control module 260.

The plurality of first windings 210 may be all the windings of a first motor, and the first motor may be a three-phase motor or a six-phase motor.

Optionally, the at least one inductor 220 may be an external inductor connected to a neutral point of the first motor.

Optionally, the at least one inductor 220 may be at least one winding of a second motor. Further, the at least one inductor 220 may also be all the windings of the second motor, and the second motor may be a three-phase motor or a six-phase motor.

The first switch group 230 is connected to the plurality of first windings 210, and the second switch group 240 is connected to the at least one inductor 220. It should be understood that the "connection" may mean a direct connection in a physical relationship, or may mean a connection through other devices.

The first switch group 230 and the second switch group 240 may be collectively referred to as a switch module, that is, the switch module includes the first switch group 240 and the second switch group 240.

The control module 260 is configured to control switching states of the first switch group 230 and the second switch group 240 to form a loop between the first switch group 230, the plurality of first windings 210, the at least one inductor 220, the second switch group 240 and the power supply module 250, so that heat is generated by a current in the power battery to heat the power battery.

In the embodiments of the present application, currents flowing through the plurality of first windings have the same magnitude and phase.

Similar to the control method in FIG. 1, the control module 260 controls the switches in the first switch group 230 and the second switch group 240 to be turned on and off periodically, thereby generating an alternating current in loops formed between the power supply module 250, the first switch group 230, the second switch group 240, the plurality of first windings 210 and the at least one inductor 220. For example, in the first cycle, the control module 260 controls the switches in the first switch group 230 and the second switch group 240 so that the current direction flows from the positive direction to the negative direction of the power supply module, so as to form a first loop which may also be called a discharging loop. In the second cycle, the control module 260 controls the switches in the first switch group 230 and the second switch group 240 so that the current direction flows from the negative direction to the positive direction of the power supply module, so as to form a second loop which may also be called a charging loop. The first loop and the second loop are configured to make the current generate heat in the power battery, thereby heating the power battery.

In addition, the switches in the first switch group 230 and the second switch group 240 are turned on and off periodically, that is, the switches in the first switch group 230 and the second switch group 240 are alternately turned on and off at a preset frequency.

The magnetomotive force of a single-phase winding is a pulsating magnetomotive force which is distributed in a stepped manner in space and alternated with time according to the change rule of current. The resultant magnetic field of the three phases of windings is obtained by superimposing the magnetomotive forces of the three single-phase windings in the three-phase motor. Generally, the currents flowing into the three phases of windings of a three-phase motor during heating are not completely equal in magnitude, and the currents flowing through two phases of windings thereof have a phase difference of 180°, and currents of the two phases without phase difference are equal in magnitude. It will cause the three phases of currents flowing through the motor windings to be asymmetrical with each other, and the high frequency of current will cause excessive vibration noise the motor in the heating process of the power battery. In the present application, by controlling that currents flowing through all the windings belonging to the first motor have the same magnitude and phase, for example, 0 to 0.5 T, the vibration noise generated in the process of heating the power battery by the loop of the first motor is effectively suppressed. At the same time, by controlling the resultant magnetic field of currents flowing into the plurality of first windings 210 and the plurality of second windings 220 belonging to the same motor to be 0 to 0.5 T, the first motor does not run, and the heating problem of a rotor in the motor can also be solved, thereby prolonging the self-heating service time of the battery.

Optionally, in the embodiment of the present application, the power battery heating system 200 includes a first motor, at least one inductor, a switch module, a control module 260 and a power supply module 250, where a first switch group 230 of the switch module is a first bridge arm group, a second switch group 240 of the switch module is a second bridge arm group, each bridge arm of the first bridge arm group and the second bridge arm group includes an upper bridge arm and a lower bridge arm, connecting points of the upper bridge arm and the lower bridge arm of each bridge arm of the first bridge arm group are connected to all the windings of the first motor in a one-to-one correspondence, connecting points of the upper bridge arm and the lower bridge arm of each bridge arm of the second bridge arm group are connected to at least one inductor in a one-to-one correspondence, and the first bridge arm group and the second bridge arm group are both connected to the power supply module in parallel. That is, the windings of the first motor are the plurality of first windings 210, and the plurality of first windings 210 are all the windings of the first motor.

The control module 260 is used for: sending a first heating signal to the switch module, where the first heating signal is configured to control all the upper bridge arms of the first bridge arm group to be turned on, all the lower bridge arms of the first bridge arm group to be turned off, all the lower bridge arms of the second bridge arm group to be turned on, and all the upper bridge arms of the second bridge arm group to be turned off, so as to form a first loop between all the upper bridge arms of the first bridge arm group, all the windings of the first motor, the at least one inductor, all the lower bridge arms of the second bridge arm group, and the power supply module; and sending a second heating signal to the switch module, where the second heating signal is configured to control all the lower bridge arms of the first bridge arm group to be turned on, all the upper bridge arms of the first bridge arm group to be turned off, all the upper bridge arms of the second bridge arm group to be turned on, and all the lower bridge arms of the second bridge arm group to be turned off, so as to form a second loop between all the lower bridge arms of the first bridge arm group, all the windings of the first motor, the at least one inductor, all the upper bridge arms of the second bridge arm group, and the power supply module, where the first loop and the second loop are configured to generate heat in a power battery by a current to heat the power battery, and Where currents flowing through all the windings of the first motor have the same magnitude and phase.

By controlling the currents flowing into all the windings of the first motor to have the same magnitude and phase, vibration noise of the first motor may be effectively suppressed when a loop of the first motor is used to heat the power battery. In addition, the power battery heating system provided by the present application will not cause the first motor to run, which can solve a heating problem of a rotor in the first motor, and thereby prolonging a self-heating service time of the battery.

Optionally, in the embodiment of the present application, the at least one inductor is an external inductor connected to a neutral point of the first motor. Optionally, the external inductor may also be replaced with an external wire.

Optionally, in the embodiment of the present application, the at least one inductor is all the windings of a second motor, and currents flowing through all the windings of the second motor have the same magnitude and phase.

By further controlling the currents flowing into all the windings of the second motor to have the same magnitude and phase, vibration noise of the motor may be effectively suppressed when loops of the first motor and the second motor are used to heat the power battery. In addition, the power battery heating system provided by the present application will not cause the first motor and the second motor to run, which can solve a heating problem of a rotor in the first motor, and thereby prolonging a self-heating service time of the battery.

Figure 3:
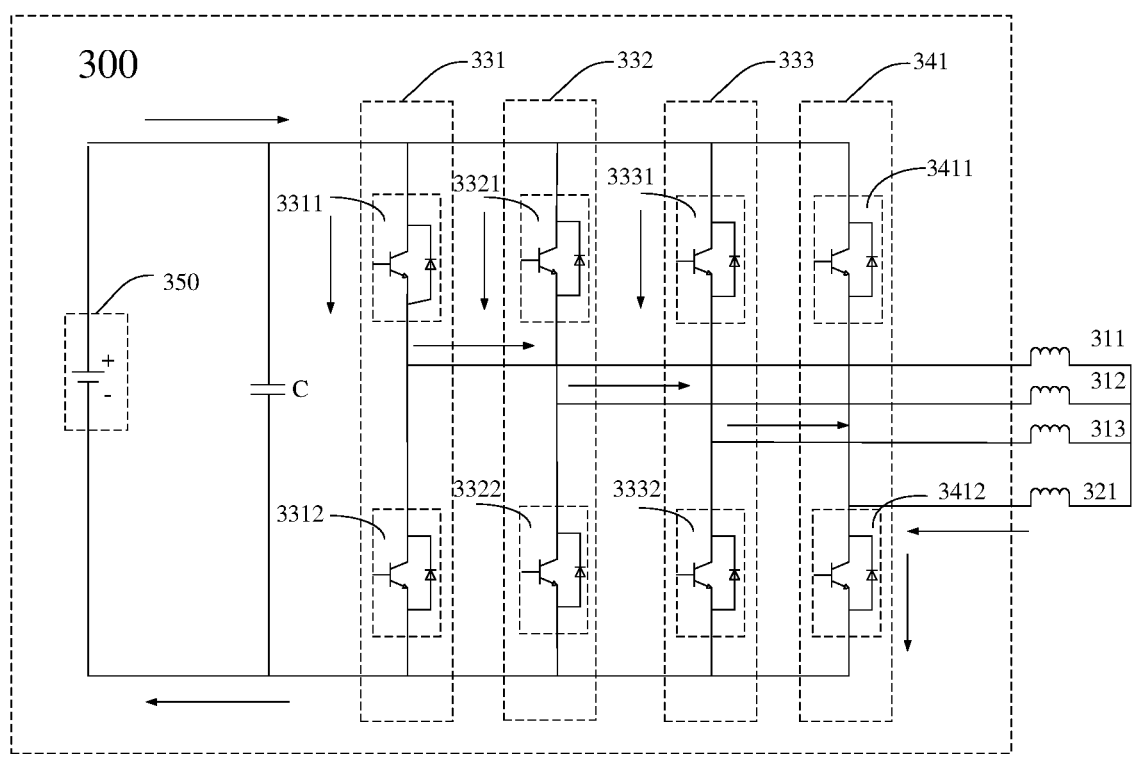
FIG. 3 and FIG. 4 are a schematic diagram of a discharge loop and a schematic diagram of a charge loop of the power battery heating system provided in the embodiment of the present application, respectively.
Figure 4:
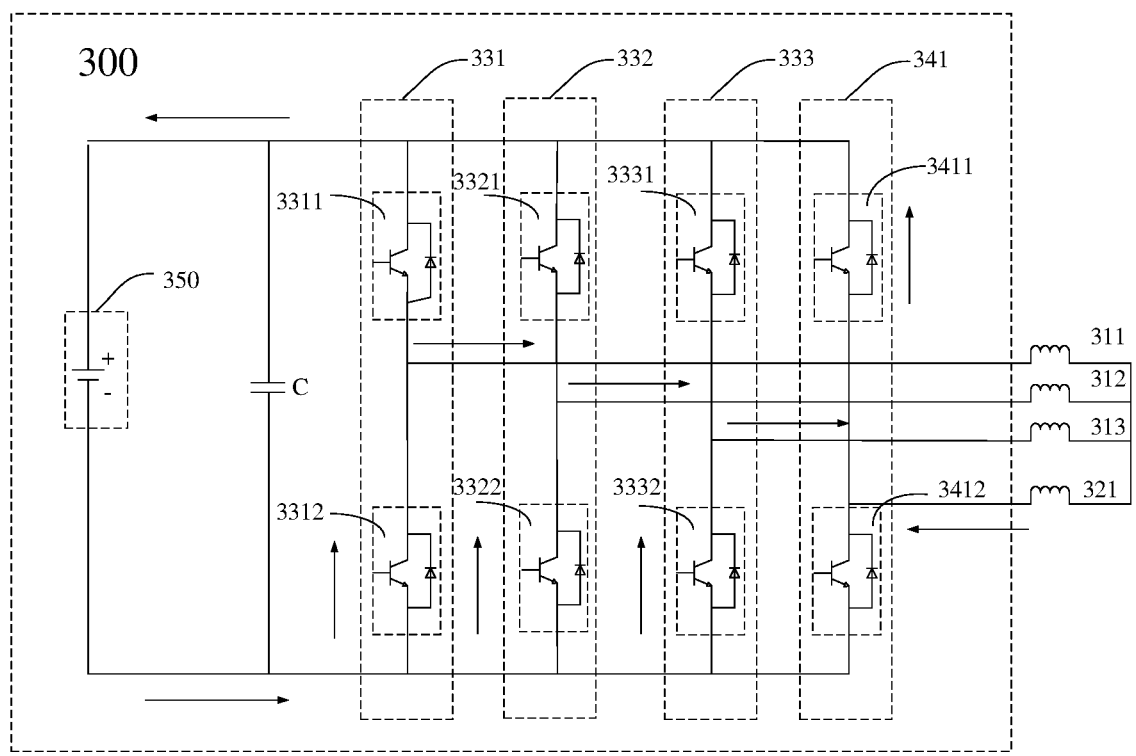

With reference to FIGS. 3 and 4, a circuit diagram of a power battery heating system 300 provided in the embodiment of the present application will be described in detail below.

As shown in FIGS. 3 and 4, a first motor is a three-phase motor, the plurality of first windings are three phases of windings in the three-phase motor, that is, a winding 311, a winding 312, and a winding 313, respectively, and the at least one inductor is an external inductor 321 connected to a neutral point of the three-phase motor. The first bridge arm group includes a bridge arm 331, a bridge arm 332, and a bridge arm 333 of the switch module. The second switch group is an external bridge arm 341 of the switch module.

Particularly, a connecting point of an upper bridge arm 3311 and a lower bridge arm 3312 of the bridge arm 331 is connected to one end of the winding 311, a connecting point of an upper bridge arm 3321 and a lower bridge arm 3322 of the bridge arm 332 is connected to one end of the winding 312, a connecting point of an upper bridge arm 3331 and a lower bridge arm 3332 of the bridge arm 333 is connected to one end of the winding 313, a connecting point of an upper bridge arm 3411 and a lower bridge arm 3412 of the external bridge arm 341 is connected to one end of the external inductor 321, and the other end of the winding 311, the other end of the winding 312, the other end of the winding 313, and the other end of the external inductor 321 are connected together.

A power supply module 350, upper bridge arms 3311-3331, the windings 311-313, the external inductor 321, and the lower bridge arm 3412 together form a discharging loop, as shown in FIG. 3; and similarly, the power supply module 350, lower bridge arms 3312-3332, the windings 311-313, the external inductor 321, and the upper bridge arm 3411 together form a charging loop, as shown in FIG. 4, where under control of a control module (not shown in the figure), the charging loop and the discharging loop are alternately turned on periodically.

In the embodiment shown in FIGS. 3 and 4, by controlling currents flowing into the windings 311-313 of the first motor to have the same magnitude and phase, vibration noise of the motor may be effectively suppressed when a loop of the first motor is used to heat a power battery. In addition, the power battery heating system provided in the embodiment of the present application will not cause the first motor to run, which can solve a heating problem of a rotor in the motor, and thereby prolonging a self-heating service time of the battery.

The windings 311-313 may be used as input windings, and the external inductor 321 may be used as an output winding. Alternatively, the windings 311-313 may be used as output windings, and the external inductor 321 may be used as an input winding. The discharging loop shown in FIG. 3 and the charging loop shown in FIG. 4 can be implemented as long as it is ensured that the upper bridge arms of the three phases of bridge arms connected to the windings 311-313 and the lower bridge arm of the external bridge arm connected to the external inductor 321 keep the switch turned on or off at the same time, and the lower bridge arms of the three phases of bridge arms connected to the windings 311-313 and the upper bridge arm of the external bridge arm connected to the external inductor 321 keep the switch turned on or off at the same time.

Optionally, the external inductor 321 may also be a wire. In addition, the number of the external inductor 321 may not be limited in the embodiment of the present application.

Optionally, the first motor may also be a six-phase motor, and the plurality of first windings may be all the windings of the six-phase motor. Vibration noise of the motor may be effectively reduced as long as currents flowing through all the windings of the first motor are controlled to have the same magnitude and phase.

Figure 5:
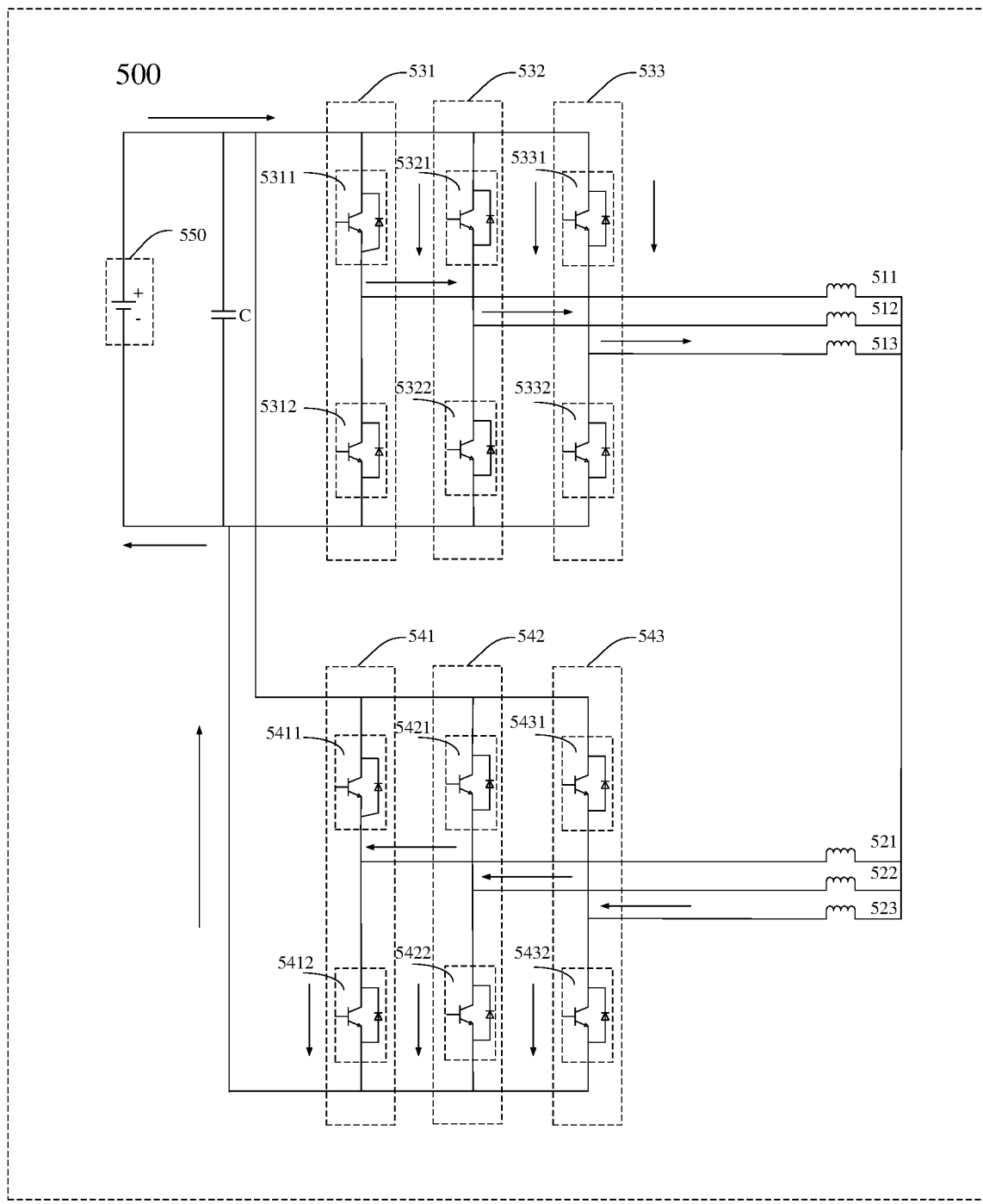
FIG. 5 and FIG. 6 are a schematic diagram of a discharge loop and a schematic diagram of a charge loop of another power battery heating system provided in the embodiment of the present application, respectively.
Figure 6:
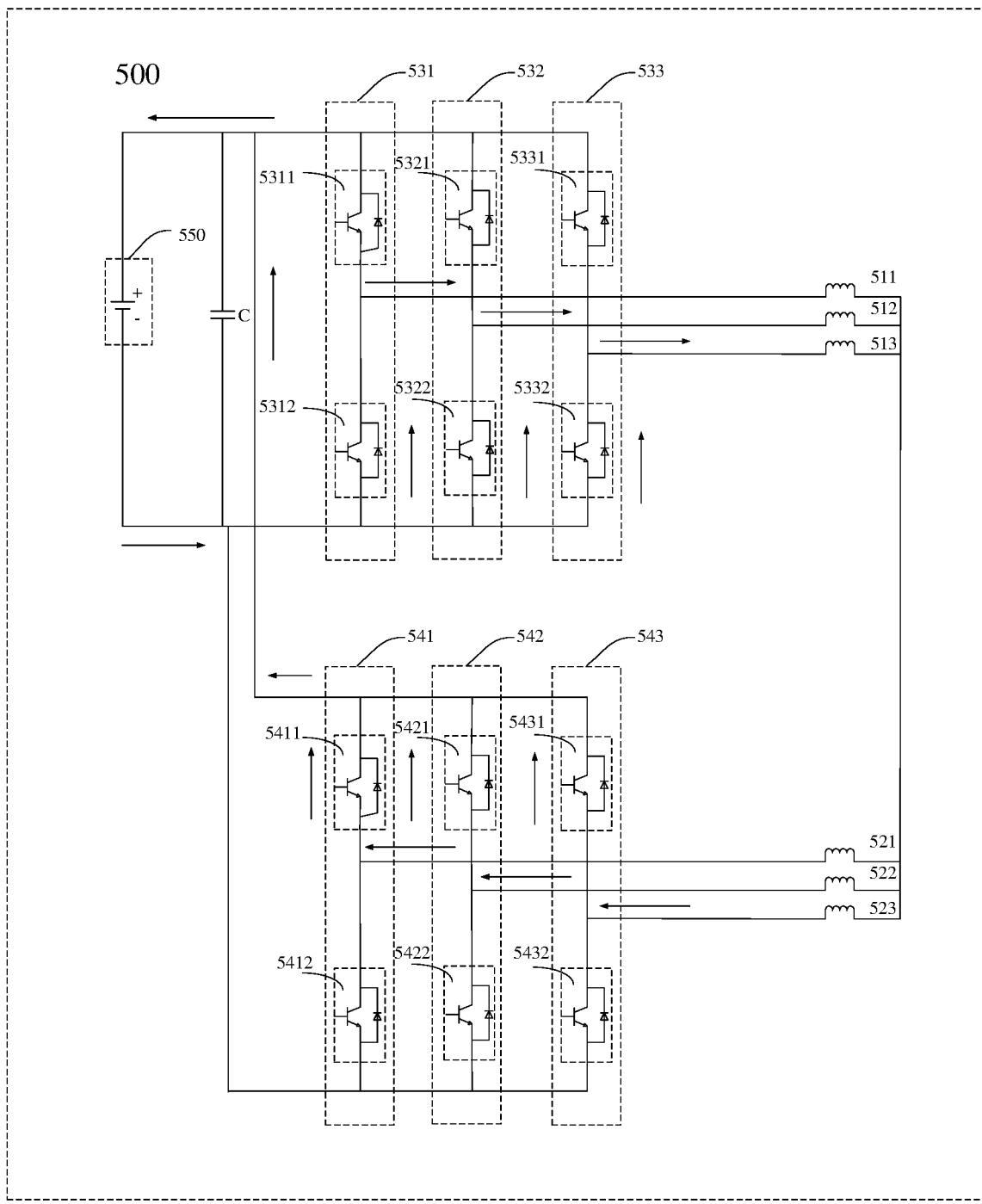

FIGS. 5 and 6 are circuit diagrams of a power battery heating system 500 provided in the embodiment of the present application.

As shown in FIGS. 5 and 6, a first motor is a three-phase motor, and the plurality of first windings are a winding 511, a winding 512, and a winding 513 respectively; and the power battery heating system 500 further includes a second motor, the second motor is also a three-phase motor, and the at least one inductor is a winding 521, a winding 522, and a winding 523 of the second motor respectively. The first bridge arm group includes a bridge arm 531, a bridge arm 532, and a bridge arm 533 of a switch module. The second switch group includes a bridge arm 541, a bridge arm 542, and a bridge arm 543 of the switch module.

Particularly, a connecting point of an upper bridge arm 5311 and a lower bridge arm 5312 of the bridge arm 531 is connected to one end of the winding 511, a connecting point of an upper bridge arm 5321 and a lower bridge arm 5322 of the bridge arm 532 is connected to one end of the winding 512, a connecting point of an upper bridge arm 5331 and a lower bridge arm 5332 of the bridge arm 533 is connected to one end of the winding 513, a connecting point of an upper bridge arm 5411 and a lower bridge arm 5412 of the bridge arm 541 is connected to one end of the winding 521, a connecting point of an upper bridge arm 5421 and a lower bridge arm 5422 of the bridge arm 542 is connected to one end of the winding 522, a connecting point of an upper bridge arm 5431 and a lower bridge arm 5432 of the bridge arm 543 is connected to one end of the winding 523, and the other end of the winding 511, the other end of the winding 512, the other end of the winding 513, the other end of the winding 521, the other end of the winding 522, and the other end of the winding 523 are connected together.

A power supply module 550, upper bridge arms 5311-5331, the windings 511-513, the windings 521-523, and lower bridge arms 5412-5432 together form a discharging loop, as shown in FIG. 5; and similarly, the power supply module 550, lower bridge arms 5312-5332, the windings 511-513, the windings 521-523, and upper bridge arms 5411-5431 together form a charging loop, as shown in FIG. 6, where under control of a control module (not shown in the figure), the charging loop and the discharging loop are alternately turned on periodically.

In the embodiment shown in FIGS. 5 and 6, by controlling currents flowing into all the windings 511-513 of the first motor to have the same magnitude and phase, vibration noise of the first motor may be effectively suppressed in a process of heating a power battery through a loop of the first motor. Similarly, by controlling currents flowing out of all the windings 521-523 of the second motor to have the same magnitude and phase, vibration noise of the second motor may be effectively suppressed in a process of heating a power battery through a loop of the second motor.

The windings 511-513 may be used as input windings, and the windings 521-523 may be used as output windings. Alternatively, the windings 511-513 may be used as output windings, and the windings 521-523 may be used as input windings. The discharging loop shown in FIG. 5 and the charging loop shown in FIG. 6 can be implemented as long as it is ensured that the upper bridge arms of the three phases of bridge arms connected to the windings 511-513 and the lower bridge arms of the three phases of bridge arms connected to the windings 521-523 keep the switch turned on or off at the same time, and the lower bridge arms of the three phases of bridge arms connected to the windings 511-513 and the upper bridge arms connected to the windings 521-523 keep the switch turned on or off at the same time.

Optionally, the first motor may be a six-phase motor, and the second motor may be a three-phase motor. The plurality of first windings may be all the windings of the six-phase motor, and the at least one inductor may be all the windings of the three-phase motor.

Optionally, the first motor may be a three-phase motor, the second motor may be a six-phase motor, the plurality of first windings may be all the windings of the three-phase motor, and the at least one inductor is all the windings of the six-phase motor.

Optionally, the first motor is a six-phase motor, the second motor is a six-phase motor, the plurality of first windings are all the windings of the six-phase motor, and the at least one inductor is all the windings of the six-phase motor.

Optionally, the control module is configured to alternately send the first heating signal and the second heating signal to the switch module at a preset frequency. That is, the control module starts timing when sending the first heating signal to the switch module, and sends the second heating signal to the switch module after a predetermined time. Next, the control module starts timing when sending the second heating signal to the switch module, and sends the first heating signal to the switch module again after a predetermined time, and then the first heating signal and the second heating signal are sent repeatedly to the switch module in turn.

Optionally, in the embodiments of the present application, the power supply module is a power battery, and the control module is further configured for: determining the SOC of the power battery; sending a first heating signal and a second heating signal to the switch module if the SOC is greater than a first threshold, in other words, the current flowing through the loop is modulated into an alternating current; and sending a third heating signal to the switch module if the SOC is less than or equal to the first threshold. The third heating signal is configured for controlling the switch in the switch module to be turned on or off, so that the current direction of the loop is constant, that is, the current flowing through the loop is modulated into a direct current, so that the heat generated by the first motor is transmitted to the power battery through the vehicle cooling system to heat the power battery.

State of charge (SOC) refers to the ratio of the remaining capacity of a battery at a certain discharge rate to the rated capacity under the same conditions. SOC is one of the important parameters of the battery management system, and it is also the basis of the charge and discharge control strategy and the battery balancing work of the whole vehicle. However, due to the complexity of the structure of the lithium battery itself, the SOC cannot be directly obtained by measuring, and can only be estimated according to some external characteristics of the battery, such as internal resistance, temperature, current and other related parameters of the battery, using relevant characteristic curves or calculation formulas.

The embodiments of the present application may be applied to the scenario of heating the power battery with lower temperature. For example, it may be applied to specific scenarios where the temperature of the power battery is increased by heating the power battery to reach the temperature at which the battery pack can be used normally. Specifically, in the embodiments of the present application, when the SOC of the power battery is greater than the first threshold, the current flowing through the loop may be modulated into an alternating current, and the power battery is heated by using the heat generated by the alternating current through the internal resistance of the power battery, thereby improving the heating efficiency. When the SOC of the battery is less than or equal to the first threshold, that is, when the battery power is insufficient, the power battery is heated by using the heat generated by the direct current in the winding, thereby reducing the power consumption and improving the flexibility of the power battery heating system.

Optionally, the control module may control the first switch group and the second switch group at the beginning so that the current flowing through the motor loop is a direct current, and periodically determine the SOC of the power battery. Once it is determined that the SOC of the power battery is greater than a first threshold, the control module controls the first switch group and the second switch group so that the current flowing through the motor loop is an alternating current, and the power battery is heated by using the heat generated by the alternating current through the internal resistance of the power battery, thereby improving the heating efficiency.

In some embodiments, the space vector control method (Space Vector Pulse Width Modulation, SVPWM) algorithm may be used to modulate the current in the motor winding into direct current or alternating current.

It should be noted that when the motor winding is energized with direct current, the radial electromagnetic force of the motor will be reduced, and the eddy current loss of the motor rotor will be reduced, thereby reducing the heat generation of the rotor. Therefore, when the motor winding is energized with direct current, the heat generation and electromagnetic vibration noise of the motor rotor will be reduced.

Optionally, in the embodiments of the present application, the control module is specifically configured to obtain the working state of the first motor; and send a first heating signal and a second heating signal to the switch module when the first motor is in a non-driving state.

By judging the working state of the motor, it is prevented that the power battery is heated when the motor is in a driving state, which may affect the performance of a power device such as a vehicle.

Further, the control module is specifically configured to send the first heating signal and the second heating signal to the switch module when the first motor is in a non-driving state and the power battery heating system is fault-free.

It should be noted that, in the embodiments of the present application, the fault of the battery heating system refers to the fault of any one of the first motor, the motor controller, the switch module, and the heat conduction loop. The fault of the heat conduction loop includes but is not limited to the damage of the intercommunication valve and the lack of medium in the heat conduction loop.

Optionally, the gear information and the motor rotate speed information may be obtained, and based on this, it is judged whether the first motor is in a driving state or a non-driving state. Specifically, when it is determined that the current gear is P and the vehicle speed is 0, it indicates that the first motor is in a non-driving state. When it is determined that the current gear is not P or the vehicle speed is not 0, it indicates that the first motor is in a driving state.

It is judged according to the gear information and the motor rotate speed information, when any of the conditions is not met, the heating signal is not sent to the first motor, thus avoiding heating the power battery when the vehicle is under the normal running state and further affecting the vehicle performance.

Optionally, in the embodiments of the present application, the control module is further configured to receive a heating request sent by a battery management system (BMS). The heating request is configured to indicate that the power battery meets a heating condition.

By receiving the heating request sent by the BMS, the control module can heat the power battery timely to avoid affecting the use of power devices such as vehicles.

Optionally, in the embodiment of the present application, the control module is further used for: sending a heating stop signal to the switch module under the condition that a temperature of the power battery reaches a preset temperature or the temperature rise of the power battery is abnormal, the heating stop signal may control the switch module, so that no loop is formed between the power supply module, the switch module, all the windings of the first motor, and at least one inductor, thereby stopping heating the power battery.

Optionally, in the embodiment of the present application, the control module may include a vehicle control unit (VCU) and/or the motor controller.

Optionally, when the VCU receives the heating request sent by the BMS, the VCU may send a control signal to the motor controller, the control signal is used for indicating to heating the power battery, that is, the control signal is used for instructing the motor controller to send a heating signal to the switch module. For example, after receiving the control signal sent by the VCU, the motor controller may send a first heating signal to the switch module, the first heating signal is used for controlling the switch module, so as to form a first loop between the power supply module, the switch module, all the windings of the first motor, and at least one inductor. After a predetermined time, the motor controller sends a second heating signal to the switch module, the second heating signal is used for controlling the switch module, so as to form a second loop between the power supply module, the switch module, all the windings of the first motor, and at least one inductor. Where current directions in the first loop and the second loop are opposite, and currents sequentially flow into all the windings of the first motor and then flow out of the at least one inductor.

Optionally, the power battery heating systems shown in FIGS. 3-6 further include capacitors C connected to the power supply module in parallel, the capacitor C mainly play a role in stabilizing voltage and filtering out clutters, etc.

Figure 8:
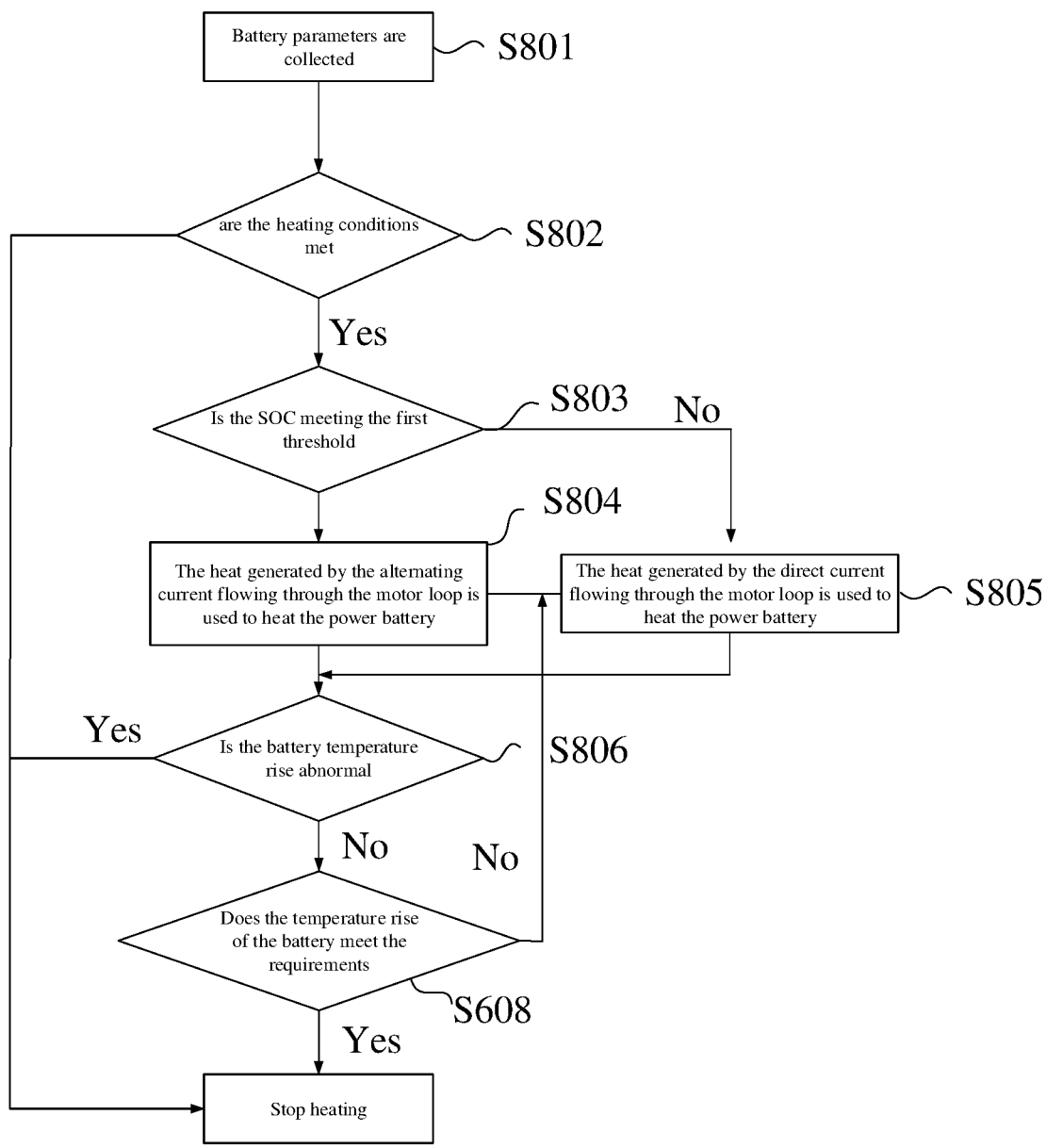
FIG. 8 is a schematic flow chart of the control method of a power battery heating system provided in the embodiment of the present application.

The power battery heating system in the embodiment of the present application has been described in detail above, and a control method of a power battery heating system in the embodiment of the present application will be described in detail below with reference to FIGS. 7 and 8. Technical features described in the device embodiment are applicable to the following method embodiment.

FIG. 7 shows a schematic frame diagram of a control method 700 of a power battery heating system in the embodiment of the present application, the power battery heating system is any of the power battery heating systems described above. The control method 700 may be executed by a control module in the power battery heating system, such as a VCU and/or a motor controller, and the control method 700 includes:

S710, sending a first heating signal to a switch module, where the first heating signal is configured to control all upper bridge arms of a first bridge arm group to be turned on, all lower bridge arms of the first bridge arm group to be turned off, all lower bridge arms of a second bridge arm group to be turned on, and all upper bridge arms of the second bridge arm group to be turned off, so as to form a first loop between all the upper bridge arms of the first bridge arm group, all the windings of a first motor, at least one inductor, all the lower bridge arms of the second bridge arm group, and a power supply module.

S720, sending a second heating signal to the switch module, where the second heating signal is configured to control all the lower bridge arms of the first bridge arm group to be turned on, all the upper bridge arms of the first bridge arm group to be turned off, all the upper bridge arms of the second bridge arm group to be turned on, and all the lower bridge arms of the second bridge arm group to be turned off, so as to form a second loop between all the lower bridge arms of the first bridge arm group, all the windings of the first motor, at least one inductor, all the upper bridge arms of the second bridge arm group, and the power supply module.

Where the first loop and the second loop are configured to generate heat by a current to in a power battery to heat the power battery, and currents flowing through all the windings of the first motor have the same magnitude and phase.

Optionally, in the embodiment of the present application, the first motor is a three-phase motor.

Optionally, in the embodiment of the present application, the at least one inductor is an external inductor connected to a neutral point of the first motor.

Optionally, in the embodiment of the present application, the at least one inductor is at least one winding of a second motor.

Optionally, in the embodiment of the present application, the power battery heating system further includes a second motor, and the at least one inductor is all the windings of the second motor, and currents flowing through all the windings of the second motor have the same magnitude and phase.

Optionally, in the embodiment of the present application, the VCU may send a control signal to the motor controller after determining that a power battery meets a heating condition, the control signal is used for indicating to heat the power battery, and then the motor controller sends a first heating signal to the switch module, the first heating signal controls all the upper bridge arms of the first bridge arm group, all the windings of the first motor, at least one inductor, all the lower bridge arms of the second bridge arm group, and the power supply module to form a first loop; and the motor controller sends a second heating signal to the switch module at a predetermined time after sending the first heating signal, the second heating signal controls all the lower bridge arms of the first bridge arm group, all the windings of the first motor, at least one inductor, all the upper bridge arms of the second bridge arm group, and the power supply module to form a second loop.

Optionally, in the embodiment of the present application, the sending a first heating signal and a second heating signal to the switch module includes: sending the first heating signal and the second heating signal to the switch module alternately at a preset frequency. That is, the first loop and the second loop are alternately formed.

Optionally, in the embodiments of the present application, the power supply module is a power battery, and the sending a first heating signal and a second heating signal to the switch module includes: determining a state of charge (SOC) of the power battery; and sending the first heating signal and the second heating signal to the switch module if the SOC is greater than a first threshold.

Optionally, in the embodiments of the present application, the sending a first heating signal and a second heating signal to the switch module includes: acquiring a working state of the first motor; and sending the first heating signal and the second heating signal to the switch module when the first motor is in a non-driving state.

Optionally, in the embodiments of the present application, the control method further includes: sending a heating stop signal to the switch module when the temperature of the power battery reaches a preset temperature, or the temperature rise of the power battery is abnormal.

The control method of a power battery heating system in the embodiment of the present application will be described in detail below by taking the power battery heating systems 300 shown in FIGS. 3 and 4 and the power battery heating systems 500 shown in FIGS. 5 and 6 as examples respectively. FIG. 8 shows a schematic flow chart of a control method 800. As shown in FIG. 8, the control method 800 includes the following steps.

S801, the BMS collects battery parameters such as temperature, SOC, voltage signal and current signal of battery pack.

S802, the BMS judges whether the heating conditions are met according to various parameters of the battery, and if yes, the BMS sends a corresponding heating request to the VCU according to the SOC state, for example, the BMS sends the required electric power for heating to a preset temperature to the VCU.

S803, the BMS or VCU judges whether the SOC of the battery is greater than a first threshold.

S804, if the SOC is greater than the first threshold, heat generated by the alternating current flowing through the motor loop is used to heat the power battery.

S805, if the SOC is less than or equal to the first threshold, heat generated by the direct current flowing through the motor loop is used to heat the power battery.

After S804, the VCU reads the current working state of the first motor.

For example, the VCU sends a driving signal to the motor controller when the first motor is in a driving state (that is, a working state). At the moment, the motor controller sends a periodic driving signal to a switch module to control the upper bridge arms and lower bridge arms of bridge arms 331-333 and the bridge arm 341 to switch on and off, so as to realize inverter control over a current of the power battery. The VCU sends a control signal to the motor controller when the first motor is in a non-driving state. At the moment, the motor controller sends a first heating signal and a second heating signal to the switch module, so as to alternately control upper bridge arms of bridge arms 331-333 with the lower bridge arm of the bridge arm 341, and lower bridge arms of the bridge arms 331-333 with the upper bridge arm of the bridge arm 341 to keep switched on and off simultaneously.

Particularly, when upper bridge arms 3311, 3321, and 3331 of the bridge arms 331-333 and a lower bridge arm 3412 of the bridge arm 341 are turned on, and lower bridge arms 3312, 3322, and 3332 of the bridge arms 331-333 and an upper bridge arm 3411 of the bridge arm 341 are turned off, the battery 350 is discharged, a discharging loop is 350 (+)→(3311/3321/3331)→(311/312/313)→(321)→(3412)→350 (−), and a current state is as shown in FIG. 3. When the lower bridge arms 3312, 3322, and 3332 of the bridge arms 331-333 and the upper bridge arm 3411 of the bridge arm 341 are turned on, and the upper bridge arms 3311, 3321, and 3331 of the bridge arms 331-333 and the lower bridge arm 3412 of the bridge arm 341 are turned off, the battery 350 is charged, a charging loop is 350 (−)→(3312/3322/3332)→(311/312/313)→(321)→(3411)→350 (+), and a current state is as shown in FIG. 4.

Moreover, the VCU sends a driving signal to the motor controller when the first motor is in a driving state (that is, a working state). At the moment, the motor controller controls upper bridge arms and lower bridge arms of bridge arms 541-543 to keep turned off, and upper bridge arms and lower bridge arms of bridge arms 531-533 are switched on and off according to a periodic driving signal sent by the motor controller, so as to realize inverter control over a current of the battery. The VCU sends a control signal to the motor controller when the first motor is in a non-driving state. At the moment, the motor controller sends a first heating signal and a second heating signal to the switch module, so as to alternately control the upper bridge arms of the bridge arms 531-533 with the lower bridge arms of the bridge arms 541-543, and the lower bridge arms of the bridge arms 531-533 with the upper bridge arms of the bridge arms 541-543 to keep switched on and off simultaneously.

Particularly, when upper bridge arms 5311, 5321, and 5331 of the bridge arms 531-533, and lower bridge arms 5412, 5422, and 5432 of the bridge arms 541-543 are turned on, and lower bridge arms 5312, 5322, and 5332 of the bridge arms 531-533, and upper bridge arms 5411, 5421, and 5431 of the bridge arms 541-543 are turned off, the battery 550 is discharged, a discharging loop is 550 (+)→(5311/5321/5331)→(511/512/513)→(521/522/523)→(5412/5422/5432)→550 (−), and a current state is as shown in FIG. 5. When the lower bridge arms 5312, 5322, and 5332 of the bridge arms 531-533, and the upper bridge arms 5411, 5421, and 5431 of the bridge arms 541-543 are turned on, and the upper bridge arms 5311, 5321, and 5331 of the bridge arms 531-533, and the lower bridge arms 5412, 5422, and 5432 of the bridge arms 541-543 are turned off, the battery 550 is charged, a charging loop is 550 (−)→(5312/5322/5332)→(511/512/513)→(521/522/523)→(5411/5421/5431)→550 (+), and a current state is as shown in FIG. 6.

S806, the BMS judges whether the temperature of the battery pack is abnormal, and if yes, it sends information of abnormal temperature rise to the VCU, and the VCU forwards the information of abnormal temperature rise to the motor controller to stop heating.

S807, if it is judged that the temperature rise is not abnormal in S606, the BMS judges whether the temperature of the battery pack meets the requirements, if yes, the VCU forwards the information of stop heating to the motor controller to stop heating; otherwise, S604/S605 and S606 are repeated.

Figure 9:
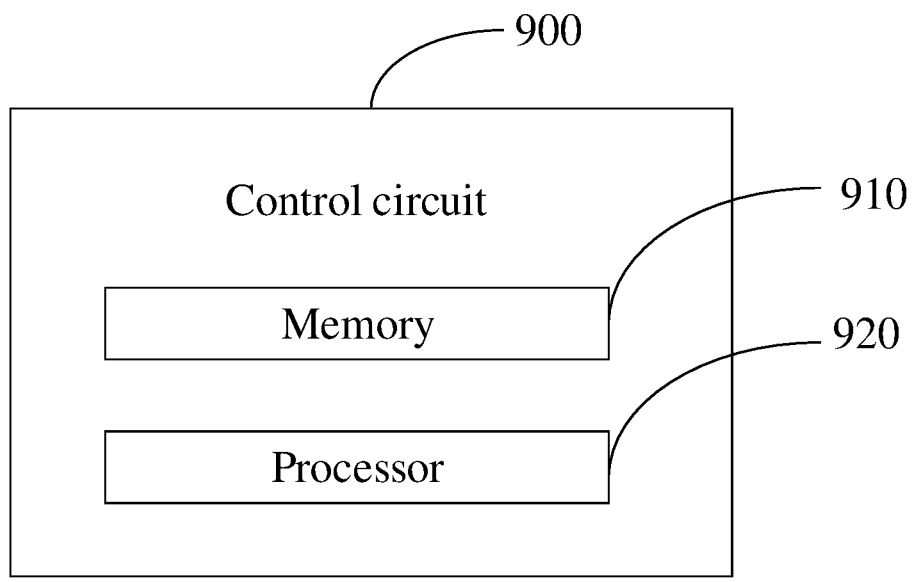
FIG. 9 is a schematic structural diagram of a control circuit of a power battery heating system provided in the embodiment of the present application.

FIG. 9 shows a schematic frame diagram of a control circuit 900 of a power battery heating system in the embodiment of the present application. As shown in FIG. 9, the control circuit 900 includes a processor 920, and optionally, the control circuit 900 further includes a memory 910, where the memory 910 is used for storing an instruction, and the processor 920 is used for reading the instruction and executing, based on the instruction, methods in various foregoing embodiments of the present application.

Optionally, the processor 920 corresponds to a control module of any of the power battery heating systems described above.

Optionally, the embodiments of the present application further provide a power device. The power device includes a power battery and any one of the power battery heating systems. The power battery heating systems are configured to heat the power battery, and the power battery provides power for the power device.

Optionally, the power device is an electric vehicle.

The embodiments of the present application further provide a readable storage medium for storing a computer program. The computer program is configured to execute the methods of the aforementioned various embodiments of the present application.

Those of ordinary skill in the art may be aware that the units and algorithm steps of each example described in combination with the embodiments disclosed herein can be implemented in electronic hardware, or a combination of computer software and electronic hardware. Whether these functions are implemented in hardware or software depends on the specific application and design constraints of the technical scheme. Technicians may use different methods to implement the described functions for each specific application, but such implementation should not be considered beyond the scope of the present application.

Those skilled in the art can clearly understand that, for the convenience and conciseness of description, the specific working processes of the systems, devices and units described above may refer to the corresponding processes in the aforementioned method embodiments, which will not be repeated here.

In the provided embodiments of the present application, it should be understood that the disclosed system, device, and method may be implemented in other ways. For example, the device embodiments described above are only illustrative. For example, the division of the units is only a logical function division, and there may be other divisions in actual implementation, for example, a plurality of units or components may be combined or may be integrated into another system, or some features may be ignored or not implemented. In addition, the mutual coupling or direct coupling or communication connection shown or discussed may be indirect coupling or communication connection through some interfaces, devices or units, and may be in electrical, mechanical or other forms.

The units described as separate components may or may not be physically separated, and the components displayed as units may or may not be physical units, that is, they may be located in one place or distributed to a plurality of network units. Some or all of the units may be selected according to actual needs to achieve the objects of the embodiments.

In addition, each functional unit in each embodiment of the present application may be integrated into one processing unit, or each unit may physically exist separately, or two or more units may be integrated into one unit.

The functions may be stored in a computer readable storage medium if they are implemented in the form of software functional units and sold or used as independent products. Based on this understanding, in essence, an essential part of the technical schemes of the present application, or a part thereof that contributes to the prior art, or a part of the technical schemes may be embodied in the form of a software product, and the computer software product is stored in a storage medium, and includes a number of instructions to make a computer device (which may be a personal computer, a server, or a network device and the like) execute all or part of the steps of the method described in the various embodiments of the present application. The aforementioned storage media include U disk, mobile hard disk, read-only memory (ROM), random access memory (RAM), magnetic disk or optical disk, and other media that may store program codes.

The above are only specific implementations of the present application, but the protection scope of the present application is not limited to this. Any person skilled in the art can easily think of changes or substitutions within the technical scope disclosed in the present application. These changes or substitutions shall fall within the protection scope of the present application. Therefore, the protection scope of the present application shall be subject to the protection scope of the claims.

What is claimed is:

1. A control method of a power battery heating system, wherein:
    the power battery heating system comprises a first motor, at least one inductor, a switch module, and a power supply module,
    wherein the switch module comprises a first bridge arm group and a second bridge arm group, each bridge arm of the first bridge arm group and the second bridge arm group comprises an upper bridge arm and a lower bridge arm, connection points of the upper bridge arm and the lower bridge arm of each bridge arm of the first bridge arm group are connected to all windings of the first motor in a one-to-one correspondence, connection points of the upper bridge arm and the lower bridge arm of each bridge arm of the second bridge arm group are connected to the at least one inductor in a one-to-one correspondence, and the first bridge arm group and the second bridge arm group are both connected in parallel to the power supply module; and
    the control method comprises:
    sending a first heating signal to the switch module, wherein the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, all the windings of the first motor, the at least one inductor, all the lower bridge arms of the second bridge arm group and the power supply module; and
    sending a second heating signal to the switch module, wherein the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, all the windings of the first motor, the at least one inductor, all the upper bridge arms of the second bridge arm group and the power supply module;
    wherein the first loop and the second loop are configured to generate heat in a power battery by a current to heat the power battery, and currents flowing through all the windings of the first motor have a same magnitude and phase.

2. The control method according to claim 1, wherein the at least one inductor is an external inductor connected to a neutral point of the first motor.

3. The control method according to claim 1, wherein the at least one inductor is at least one winding of a second motor.

4. The control method according to claim 3, wherein the power battery heating system further comprises the second motor, the at least one inductor is all the windings of the second motor, and currents flowing through all windings of the second motor have the same magnitude and phase.

5. The control method according to claim 1, wherein the first motor is a three-phase motor.

6. The control method according to claim 1, wherein the sending the first heating signal and the second heating signal to the switch module comprises:
    sending the first heating signal and the second heating signal to the switch module alternately at a preset frequency.

7. The control method according to claim 1, wherein the power supply module is the power battery, and the sending the first heating signal and the second heating signal to the switch module comprises:
    determining a state of charge (SOC) of the power battery; and
    sending the first heating signal and the second heating signal to the switch module under a condition that the SOC is greater than a first threshold.

8. The control method according to claim 1, wherein the sending the first heating signal and the second heating signal to the switch module comprises:
    receiving, by an motor controller, a control signal sent by a vehicle control unit, the control signal being configured to indicate to heat the power battery; and
    sending, by the motor controller, the first heating signal and the second heating signal to the switch module according to the control signal.

9. The control method according to claim 1, wherein the control method further comprises:
    sending a heating stop signal to the switch module under a condition that a temperature of the power battery reaches a preset temperature and/or a temperature rise of the power battery is abnormal, the heating stop signal being configured to indicate to stop heating the power battery.

10. The control method according to claim 1, wherein the sending the first heating signal and the second heating signal to the switch module comprises:

obtaining a working state of the first motor; and sending the first heating signal and the second heating signal to the switch module under a condition that the first motor is in a non-driving state.

11. The control method according to claim 1, wherein the control method further comprises:

receiving a heating request sent by a battery management system (BMS), the heating request being configured to indicate that the power battery meets a heating condition.

12. A control circuit of a power battery heating system, comprising a processor and a memory, wherein the memory stores instructions which, when executed by the processor, cause the control circuit to implement the control method according to claim 1.

13. A power battery heating system, comprising a first motor, at least one inductor, a switch module, a control module, and a power supply module, wherein the switch module comprises a first bridge arm group and a second bridge arm group, each bridge arm of the first bridge arm group and the second bridge arm group comprises an upper bridge arm and a lower bridge arm, connection points of the upper bridge arm and the lower bridge arm of each bridge arm of the first bridge arm group are connected to all windings of the first motor in a one-to-one correspondence, connection points of the upper bridge arm and the lower bridge arm of each bridge arm of the second bridge arm group are connected to the at least one inductor in a one-to-one correspondence, and the first bridge arm group and the second bridge arm group are both connected in parallel to the power supply module; and the control module is configured to:

send a first heating signal to the switch module, wherein the first heating signal is configured to control all the upper bridge arms of the first bridge arm group to be turned on, all the lower bridge arms of the first bridge arm group to be turned off, all the lower bridge arms of the second bridge arm group to be turned on and all the upper bridge arms of the second bridge arm group to be turned off, so as to form a first loop between all the upper bridge arms of the first bridge arm group, all the windings of the first motor, the at least one inductor, all the lower bridge arms of the second bridge arm group and the power supply module; and send a second heating signal to the switch module, wherein the second heating signal is configured to control all the lower bridge arms of the first bridge arm group to be turned on, all the upper bridge arms of the first bridge arm group to be turned off, all the upper bridge arms of the second bridge arm group to be turned on and all the lower bridge arms of the second bridge arm group to be turned off, so as to form a second loop between all the lower bridge arms of the first bridge arm group, all the windings of the first motor, the at least one inductor, all the upper bridge arms of the second bridge arm group and the power supply module;

wherein the first loop and the second loop are configured to generate heat in a power battery by a current to heat the power battery, and currents flowing through all the windings of the first motor have a same magnitude and phase.

14. The power battery heating system according to claim 13, wherein the at least one inductor is an external inductor connected to a neutral point of the first motor.

15. The power battery heating system according to claim 13, wherein the at least one inductor is at least one winding of a second motor.

16. The power battery heating system according to claim 15, wherein power battery heating system further comprises the second motor, the at least one inductor is all the windings of the second motor, and currents flowing through all the windings of the second motor have the same magnitude and phase.

17. The power battery heating system according to claim 13, wherein the first motor is a three-phase motor.

* * * * *